United States Patent
Sugita et al.

(10) Patent No.: US 11,391,608 B2
(45) Date of Patent: Jul. 19, 2022

(54) SELF-DIAGNOSIS METHOD FOR FLOW RATE CONTROL DEVICE

(71) Applicant: FUJIKIN INCORPORATED, Osaka (JP)

(72) Inventors: Katsuyuki Sugita, Osaka (JP); Ryousuke Dohi, Osaka (JP); Kaoru Hirata, Osaka (JP); Koji Kawada, Osaka (JP); Nobukazu Ikeda, Osaka (JP); Kouji Nishino, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 295 days.

(21) Appl. No.: 16/765,153

(22) PCT Filed: Nov. 20, 2018

(86) PCT No.: PCT/JP2018/042797
§ 371 (c)(1),
(2) Date: May 18, 2020

(87) PCT Pub. No.: WO2019/107216
PCT Pub. Date: Jun. 6, 2019

(65) Prior Publication Data
US 2020/0348158 A1    Nov. 5, 2020

(30) Foreign Application Priority Data
Nov. 30, 2017    (JP) .............. JP2017-230558

(51) Int. Cl.
*F16K 31/02*    (2006.01)
*G01F 1/36*    (2006.01)
(Continued)

(52) U.S. Cl.
CPC ............ *G01F 1/363* (2013.01); *F16K 31/004* (2013.01); *G05B 19/4184* (2013.01);
(Continued)

(58) Field of Classification Search
CPC ........ G01F 1/363; G01F 25/15; G01F 15/005; F16K 31/004; F16K 37/0041; F16K 37/005; G05B 19/4184; G05D 7/0635; G05D 7/06
(Continued)

(56) References Cited

U.S. PATENT DOCUMENTS

2010/0127196 A1* 5/2010 Sawada ............ F16K 31/007
251/129.06
2010/0139775 A1* 6/2010 Ohmi .................... G01F 7/005
137/12
(Continued)

FOREIGN PATENT DOCUMENTS

| JP | 2007192269 A | 8/2007 |
|----|----|----|
| JP | 4933936 B2 | 5/2012 |
| WO | 2017170174 A1 | 10/2017 |

OTHER PUBLICATIONS

International Search Report issued in PCT/JP2018/042797; dated Feb. 5, 2019.

*Primary Examiner* — Minh Q Le
(74) *Attorney, Agent, or Firm* — Studebaker & Brackett PC

(57) ABSTRACT

A self-diagnosis method of a flow rate control device includes: a step (a) for measuring a pressure drop characteristic after a pressure control valve (6) has been changed to a closed state from a state where a fluid flows from the upstream side of the pressure control valve with the opening of a flow rate control valve (8) is larger than a restriction part; a step (b) for measuring the pressure drop characteristic after the pressure control valve has been changed to the closed state from a state where the fluid flows from the upstream side of the flow rate control valve to the downstream side with the opening of the flow rate control valve is smaller than the restriction part; a step (c) for determining
(Continued)

whether there is an abnormality by comparing the pressure drop characteristic measured in step (a) with a corresponding reference pressure drop characteristic; a step (d) for determining whether there is an abnormality by comparing the pressure drop characteristic measured in step (b) with a corresponding reference pressure drop characteristic; and a step (e) for determining that there is an abnormality in the flow rate control valve when it is determined that there is an abnormality only in the step (d).

11 Claims, 8 Drawing Sheets

(51) Int. Cl.
*F16K 31/00* (2006.01)
*G05B 19/418* (2006.01)
*G05D 7/06* (2006.01)
*F16K 37/00* (2006.01)
*G01F 25/10* (2022.01)
*G01F 15/00* (2006.01)

(52) U.S. Cl.
CPC .......... *G05D 7/0635* (2013.01); *F16K 37/005* (2013.01); *F16K 37/0041* (2013.01); *G01F 15/005* (2013.01); *G01F 25/15* (2022.01); *G05D 7/06* (2013.01)

(58) Field of Classification Search
USPC ........................................ 702/47; 137/487.5
See application file for complete search history.

(56) References Cited

U.S. PATENT DOCUMENTS

| | | | |
|---|---|---|---|
| 2010/0294964 A1 | 11/2010 | Matsumoto et al. | |
| 2011/0108126 A1* | 5/2011 | Monkowski | F16K 7/14 137/12 |
| 2016/0282880 A1* | 9/2016 | Nagase | G01F 1/50 |
| 2019/0094847 A1 | 3/2019 | Nagase et al. | |
| 2020/0018413 A1* | 1/2020 | Dohi | G05D 7/06 |
| 2020/0033895 A1* | 1/2020 | Sugita | G01F 1/363 |
| 2020/0232873 A1* | 7/2020 | Nagase | G05D 7/0647 |
| 2020/0348704 A1* | 11/2020 | Sugita | G05D 7/0647 |
| 2021/0239230 A1* | 8/2021 | Dohi | F16K 41/023 |

* cited by examiner

SELF-DIAGNOSIS METHOD FOR FLOW RATE CONTROL DEVICE

The present invention relates to a self-diagnosis method of a flow rate control device, and more particularly, to a self-diagnosis method of a flow rate control device suitably used in a semiconductor manufacturing equipment, a chemical plant, or the like.

BACKGROUND OF INVENTION

In semiconductor manufacturing equipment and chemical plants, in order to control the flow of fluid such as material gas and etching gas, various types of flow meters and flow rate control devices are utilized. Among them, a pressure type flow rate control device is widely used because of its ability of controlling the flow rate of various fluids with high accuracy by a relatively simple mechanism of combining a control valve and a restriction part (e.g., orifice plate).

As a control valve of the pressure type flow rate control device, a piezoelectric element driven valve is utilized for opening and closing a metal diaphragm valve element by a piezoelectric element drive device (hereinafter, sometimes referred to as a piezo actuator). A conventional piezoelectric element driven valve is disclosed in Patent Document 1, for example.

In the piezoelectric element driven valve, the degree of extension of the piezo actuator varies depending on the magnitude of the driving voltage applied to the piezo actuator, and the pressure for pressing the metal diaphragm valve element to the valve seat changes. When the metal diaphragm valve element is pressed against the valve seat with sufficient pressing force, the valve is closed. When the pressing force is weakened, the metal diaphragm valve element is opened away from the valve seat. Piezoelectric element driven valves have the advantages of relatively high-speed operation and relatively small hysteresis in operating characteristics.

However, when using a pressure type flow rate control device in the conventional semiconductor process control, the piezoelectric element driven valve is controlled so as to eliminate the deviation from a set flow rate. It was common to perform relatively gentle opening and closing operation with an analog slightly displacement. But in recent years, flow rate control device in required to apply to, such as ALD (Atomic Layer Deposition), in such applications, high-speed control of the flow rate by opening and closing the control valve by high-speed (or very short period) pulse-shaped control signals is required.

PRIOR-ART DOCUMENT

Patent Literature

Patent Document 1: Japanese Laid-Open Patent Publication No. 2007-192269
Patent Document 2: Japanese Patent No. 4933936
Patent Document 3: International Patent Publication No. WO2017/170174

SUMMARY OF INVENTION

Problems to be Solved by Invention

In such an application as described above, the opening and closing speed, the amount of displacement and the opening and closing frequency of the piezoelectric element driven valve is remarkably increased as compared with that of a conventional one. These promote the degradation of the flow rate control of the flow rate control device and the operation failure, and the accuracy reduction of the flow rate control may occur in an earlier stage compared with a conventional one.

The present invention has been made in view of the above-mentioned problems, and a main object thereof is to provide a self-diagnosis method of the flow rate control device suitable to the pulse flow rate control or the like.

Means for Solving Problems

A self-diagnosis method of a flow rate control device according to an embodiment of the present invention includes a pressure control valve provided in a flow path, a flow rate control valve provided downstream side of the pressure control valve, a restriction part provided downstream side of the pressure control valve, and a pressure sensor provided downstream side of the pressure control valve and upstream side of the restriction part, wherein the flow rate control valve has a valve element seated on/off from a valve seat, and a piezoelectric element for moving the valve element to seat on/off the valve seat, the self-diagnosis method of the flow control device includes the following steps: (a) when the pressure control valve is in an open state and the opening degree of the flow rate control valve is larger than the opening degree of the restriction part, while a fluid is flowing from the upstream side of the pressure control valve to the downstream side through the flow rate control valve and the restriction part, changing the pressure control valve from the open state to a closed state, then measuring a pressure drop characteristic of the fluid pressure after the closed state using the pressure sensor, (b) when the pressure control valve is in the open state, where the opening degree of the flow control valve is less than the opening degree of the restriction part, and the fluid is flowing from the upstream side of the pressure control valve to the downstream side through the flow rate control valve and the restriction part, changing the pressure control valve from the open state to the closed state, then measuring the pressure drop characteristic of the fluid pressure after the closed state using the pressure sensor, (c) determining whether there is an abnormality by comparing the pressure drop characteristic measured in step (a) with a pressure drop characteristic stored in advance as reference, (d) determining whether there is an abnormality by comparing the pressure drop characteristic measured in step (b) with the pressure drop characteristic stored in advance as reference, and (e) determining a presence of abnormality in the distance between the valve seat and the valve element of the flow rate control valve when a presence of abnormality is determined only in the step (d) among the steps (c) and (d).

In an embodiment, the step (a) is performed before the step (b), or the step (b) is performed before the step (a).

In an embodiment, the step (c) is performed after the step (a) but before the step (b), and the step (d) is performed after the step (b) and the step (c).

In an embodiment, the flow rate control device further comprises a measurement storage unit for storing data measured in the step (a) and the step (b).

In an embodiment, the flow rate control device further comprises a determination storage unit for storing the result determined in the step (c) and the step (d).

In an embodiment, a strain sensor is attached to the piezoelectric element to determine the distance between the valve seat and the valve element on the basis of an output of the strain sensor.

In an embodiment, when an abnormality is determined in the distance between the valve seat and the valve element of the flow rate control valve in the step (e), it is determined that there is an abnormality in the output of the strain sensor.

In an embodiment, when the pressure drop characteristic measured in the step (b) is larger than the pressure drop characteristic as the reference stored in advance, it is determined that the output span of the strain sensor decreased.

In an embodiment, when the pressure drop characteristic measured in the step is smaller than the pressure drop characteristic stored in advance as a reference, it is determined that the output span of the strain sensor expanded.

In an embodiment, in the step (a) and the step (b), the pressure control valve is in a state of opening to a maximum set opening degree, when a fluid is flowing downstream with the pressure control valve being open.

In an embodiment, in the step (a) and the step (b), the pressure control valve is in a state of opening to an intermediate opening degree, when a fluid is flowing downstream with the pressure control valve being open.

Effect of Invention

According to the embodiments of the present invention, a self-diagnostic method of a flow rate control device considering a decrease in accuracy due to long-term use is provided.

DETAILED DESCRIPTION OF INVENTION

In WO2018/123852, the applicant discloses a piezoelectric element-driven valve configured to measure an extension of a piezoelectric actuator using a strain sensor, (also referred to as a strain gauge), which is used as a control valve for a pressure-type flow rate control device. If the extension amount or the valve opening degree of the piezo actuator can be measured more directly by using the strain sensor attached to the piezoelectric element, it is possible to know the valve opening degree more accurately as compared with the case of referring to the driving voltage of the piezo actuator.

However, it was confirmed by the inventors of the present application that in the piezoelectric element driven valve having a fixed strain sensor to the piezoelectric element, after increasing the times of opening and closing, the maximum output of the strain sensor may be lowered even when the same maximum driving voltage is applied.

In the present specification, the difference between outputs of the strain sensor when no voltage is applied to the piezoelectric element driven valve, i.e., extension of the piezoelectric element does not occur, and when the maximum drive voltage is applied to the piezoelectric element driven valve, may be referred to as the span of the strain sensor outputs. Further, the output of the strain sensor means various outputs corresponding to the resistance value of the strain sensor which varies according to the strain amount of the strain sensor, for example, it may be a resistance value itself of the strain sensor, or a voltage signal output from a Wheatstone bridge circuit incorporating the strain sensor (hereinafter referred as a bridge output signal seen in FIG. 5) or the like.

In this way, the span of the strain sensor output vary from the beginning in the pressure type flow rate control device configured to perform flow rate control on the basis of the output of the strain sensor and the accuracy of the flow rate control degrades as the number of times of the opening and closing increases. And in recent years, when the valve is repeatedly opened and closed at high speed and frequency, such decrease in the accuracy of the flow rate control may occur at a relatively early stage.

Figure 1:
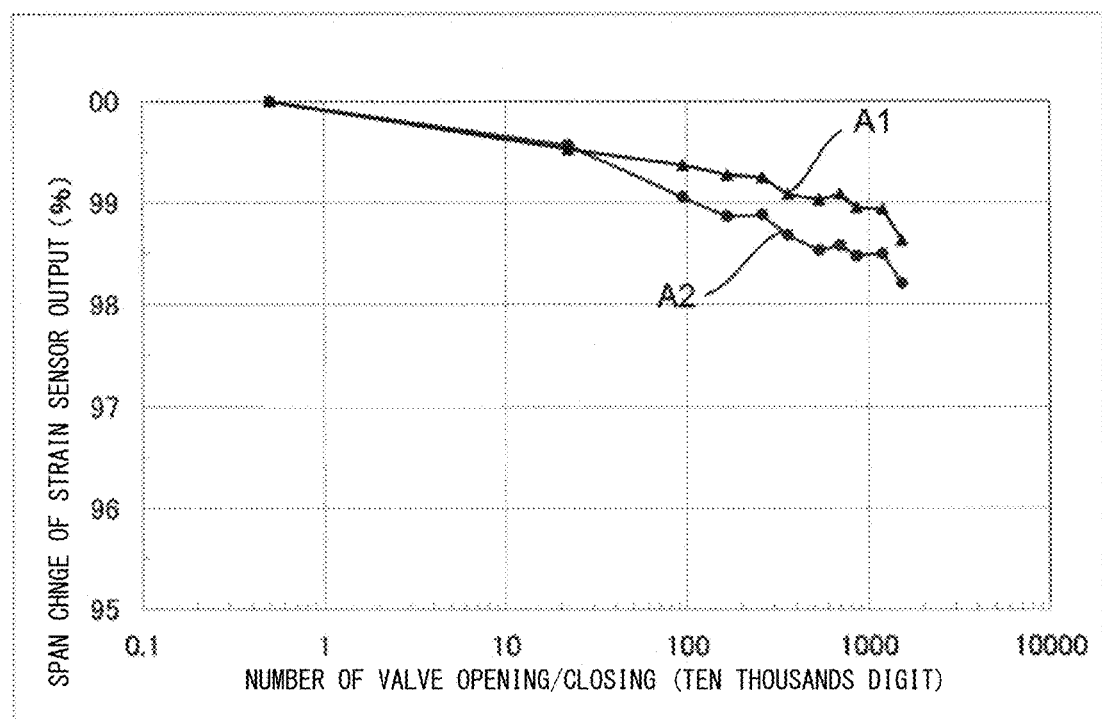
FIG. 1 is a graph showing a test result by the present inventors of the span change of the strain sensor output.

FIG. 1 shows two examples A1 and A2 of the test results of measuring change in span of the strain sensor outputs, with respect to the number of opening and closing times of the valve. As can be seen from FIG. 1, as the opening and closing times of the piezoelectric element driven valve increases, and the number of times of changes in cyclic stress applied to the strain sensor increases, the span of the strain sensor output decreases. In addition, in the two examples A1 and A2, slightly different span changes are shown. This is considered to be caused by the variation in the characteristics of the strain sensor in each device, resulting in change in the valve opening and closing degrees, i.e., the relationship between the expansion of the piezo actuator and the strain sensor output. In FIG. 1, the horizontal axis represents the number of times of opening and closing which is logarithmically displayed (unit: 10,000 times), the vertical axis shows the magnitude of the relative bridge output signal at the time of applying the maximum piezo driving voltage, considering the bridge output signal at the time of applying the maximum piezo driving voltage after performing 5000 times the opening and closing operation as 100%.

Therefore, the present inventors have intensively studied on a method of detecting changes in the characteristics of the strain sensor in the piezoelectric element drive type valve provided in the pressure-type flow rate control device, in particular, in the span of the strain sensor output. Then it is found that the change in the span of the strain sensor can be detected by the self-diagnosis method of performing measurement of the pressure drop characteristic in the pressure-type flow rate control device, and by correcting the output of the strain sensor based on the result, the flow rate control can be performed with good accuracy over a long period of time regardless of the equipment.

Figure 2:
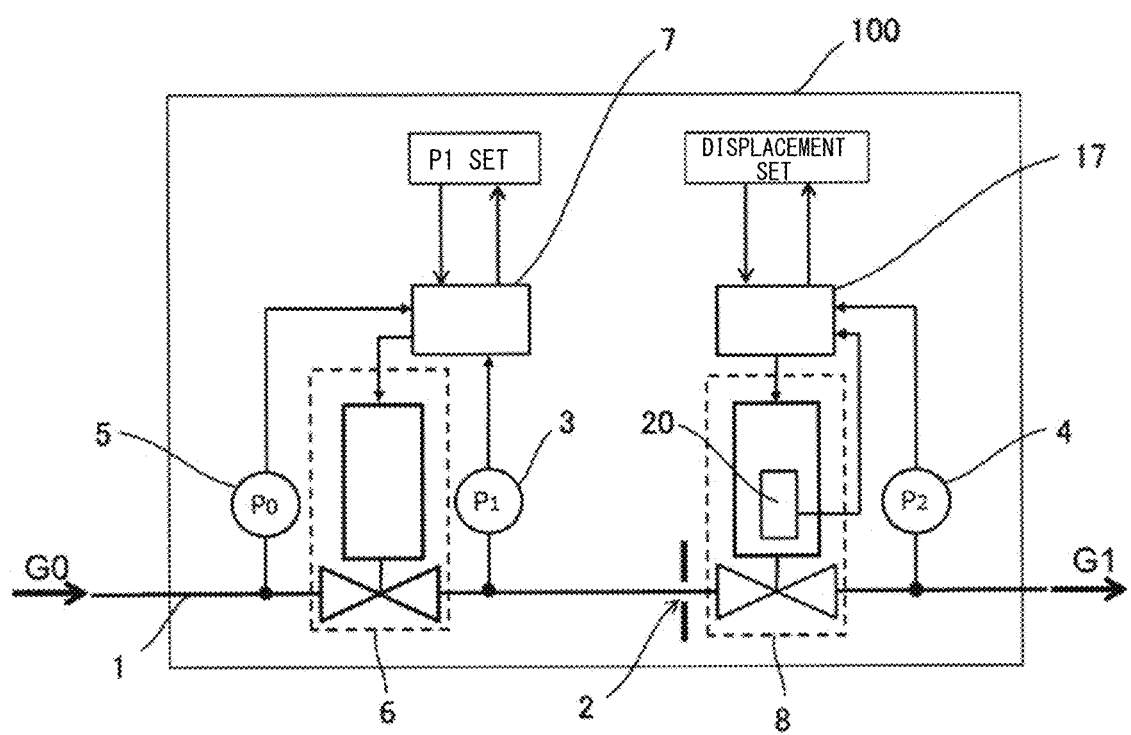
FIG. 2 is a schematic diagram showing a configuration of a flow rate control device according to an embodiment of the present invention.

Embodiments of the present invention will be described below. FIG. 2 shows a configuration of a flow rate control device 100 for performing the self-diagnostic method according to an embodiment of the present invention. The flow rate control device 100 includes a pressure control valve 6 provided in an inlet side of a flow path 1 of a gas G0, a flow rate control valve 8 provided downstream side of the control valve 6, a first (or upstream) pressure sensor 3 for detecting a pressure $P_1$ downstream of the pressure control valve 6 and upstream of the flow rate control valve 8, a restriction part 2 disposed downstream of the pressure control valve 6 and upstream of the flow rate control valve 8.

The restriction part 2 of the embodiment is constituted by an orifice plate disposed upstream of the flow rate control valve 8. Since the area of the orifice is fixed, the orifice plate functions as a restriction part having a fixed opening. In this specification, the "restriction part" is a portion in which a cross-sectional area of the flow path is limited to be smaller than a cross-sectional area of the flow path front and back, for example, an orifice plate, a critical nozzle, a sonic nozzle, or the like is used for the configuration, other configurations may be used. Further, in the present specification, a distance between the valve seat and the valve element of the valve is considered as an opening degree, the restriction part also includes a valve structure in which this opening degree is simulated to a virtual variable orifice. Such a valve structure may function as a restriction part having a variable opening.

The flow rate control device 100 of the present embodiment also includes a second (or downstream) pressure sensor 4 for measuring a pressure $P_2$ downstream of the flow rate control valve 8, and an inflow pressure sensor 5 for detecting the pressure P0 on the upstream side of the pressure control valve 6. However, the flow rate control device 100 may not include the second pressure sensor 4 or the inflow pressure sensor 5 in other embodiments.

The first pressure sensor 3 can measure the upstream pressure $P_1$, which is the fluid pressure between the pressure control valve 6 and the restriction part 2 or the flow rate control valve 8, the second pressure sensor 4 can measure the downstream pressure $P_2$ of the restriction part 2 or the flow rate control valve 8. Further, the inflow pressure sensor 5 can measure the inflow pressure $P_0$ of a material gas, an etching gas or a carrier gas supplied to the flow rate control device 100 from a connected gas supply device (e.g., raw material vaporizer or a gas supply source, etc.). The inflow pressure $P_0$ can be used to control the gas supply amount and pressure from the gas supply device.

The downstream side of the flow rate control valve 8 is connected to a process chamber of the semiconductor manufacturing equipment via a downstream valve (not shown). A vacuum pump is connected to the process chamber, typically, a gas G1 with a controlled flow rate is supplied from the flow rate control device 100 to the process chamber in a state where the inside of the process chamber is evacuated. As the downstream valve, for example, a known Air Operated Valve operated by compressed air or a solenoid valve or the like can be used.

The pressure control valve 6 may be, for example, a known piezoelectric element driven valve configured to drive a metal diaphragm valve element with a piezo actuator. As described later, the opening of the pressure control valve 6 is controlled on the basis of the output from the first pressure sensor 3. The upstream pressure P1 output from the first pressure sensor 3 is feedback controlled so as to be maintained at the input set value.

Further, in the present embodiment, the flow rate control valve 8 is a piezoelectric element driven valve including a valve element, a piezoelectric element, and a strain sensor 20 for detecting an elongation amount of the piezoelectric element. The valve element is arranged so as to be seated or apart from the valve seat by the piezoelectric element. As described later, the flow rate control valve 8 is configured to enable the drive of the piezoelectric element being feedback controlled based on the signal output from the strain sensor 20.

Figure 3:
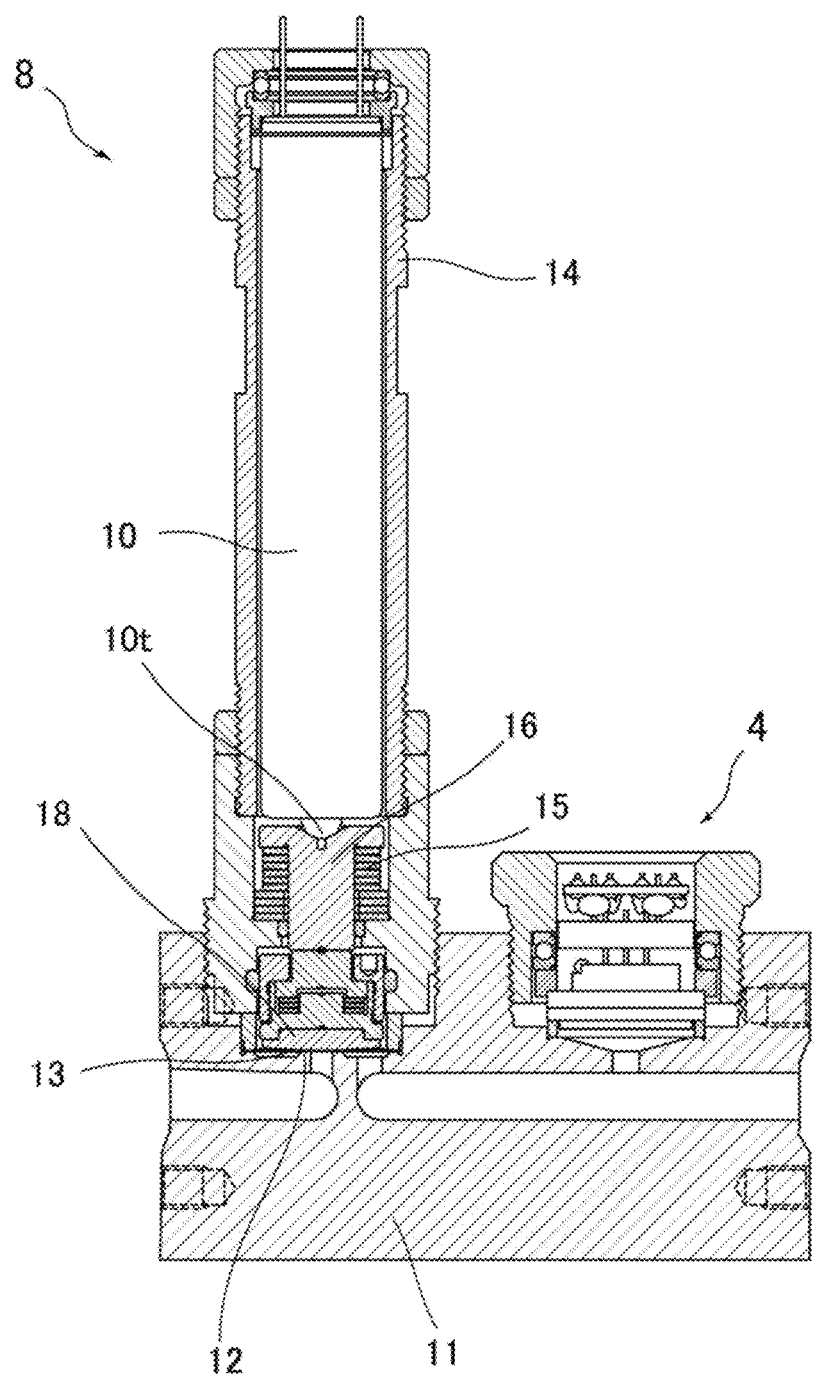
FIG. 3 is a cross-sectional view showing a flow rate control valve and a second pressure sensor used in an embodiment of the present invention.

FIG. 3 shows, a configuration example of a of a flow rate control valve 8 shown in FIG. 2, and a second pressure sensor 4 provided downstream side thereof. The flow rate control valve 8 and the second pressure sensor 4 are attached to a main body block 11. In addition, the inlet side of the main body block 11 is connected to another main body block attached with the pressure control valve 6 and the first pressure sensor 3 shown in FIG. 2. Further, the restriction part 2 shown in FIG. 2, is placed in the connection part between the main body block 11 and another main body block, for example, and is fixed as an orifice plate via a gasket. The diameter of the orifice is set to such as 100 μm to 500 μm.

The flow rate control valve 8 shown in FIG. 3 is a normally open type valve configured so as to move the valve element in the direction of the valve seat by extension of a piezo actuator 10, the piezo actuator 10 having one or a plurality of piezoelectric elements 10b (refer to FIG. 4), and a metal diaphragm valve element 13 disposed below the piezo actuator 10, and a guide cylinder 14 provided outside of the piezo actuator 10.

A lower end 10t of the piezo actuator 10 is supported by a support 16, a valve element pressing 18 in contact with a diaphragm valve element 13 are provided below the support 16. Metal diaphragm valve element 13 is an autoelastic return type thin plate, formed by nickel chromium alloy steel, etc.

In the above configuration, in a state where a driving voltage is not applied to the piezo actuator 10, the metal diaphragm valve element 13 (central portion) is apart from the valve seat 12 by a self-elastic force. Further, in the present embodiment, the elastic member 15 disposed around the support 16 (here a pan spring) supports the support 16 and the piezo actuator 10, the metal diaphragm valve element 13 is apt to be separated from the valve seat 12 when no voltage is applied. On the other hand, when a driving voltage is applied to the piezo actuator 10, the piezo actuator 10 extends downward inside the guide cylinder 14 that is fixed to the valve element 11. Then, the lower end 10t of the piezo actuator 10 pushes down the support 16 against the biasing force of the elastic member 15, in conjunction with this, the valve element pressing 18 moves the metal diaphragm valve element 13 towards the valve seat 12.

In such a normally open type valve, the piezo actuator 10 is in the closed valve state when the maximum driving voltage is applied thereto, the opening degree can be arbitrarily adjusted by reducing the driving voltage. The normally open type valve has an advantage of good response. The normally open type piezoelectric element driven valve, for example, is shown in Patent Document 2.

Figure 4:
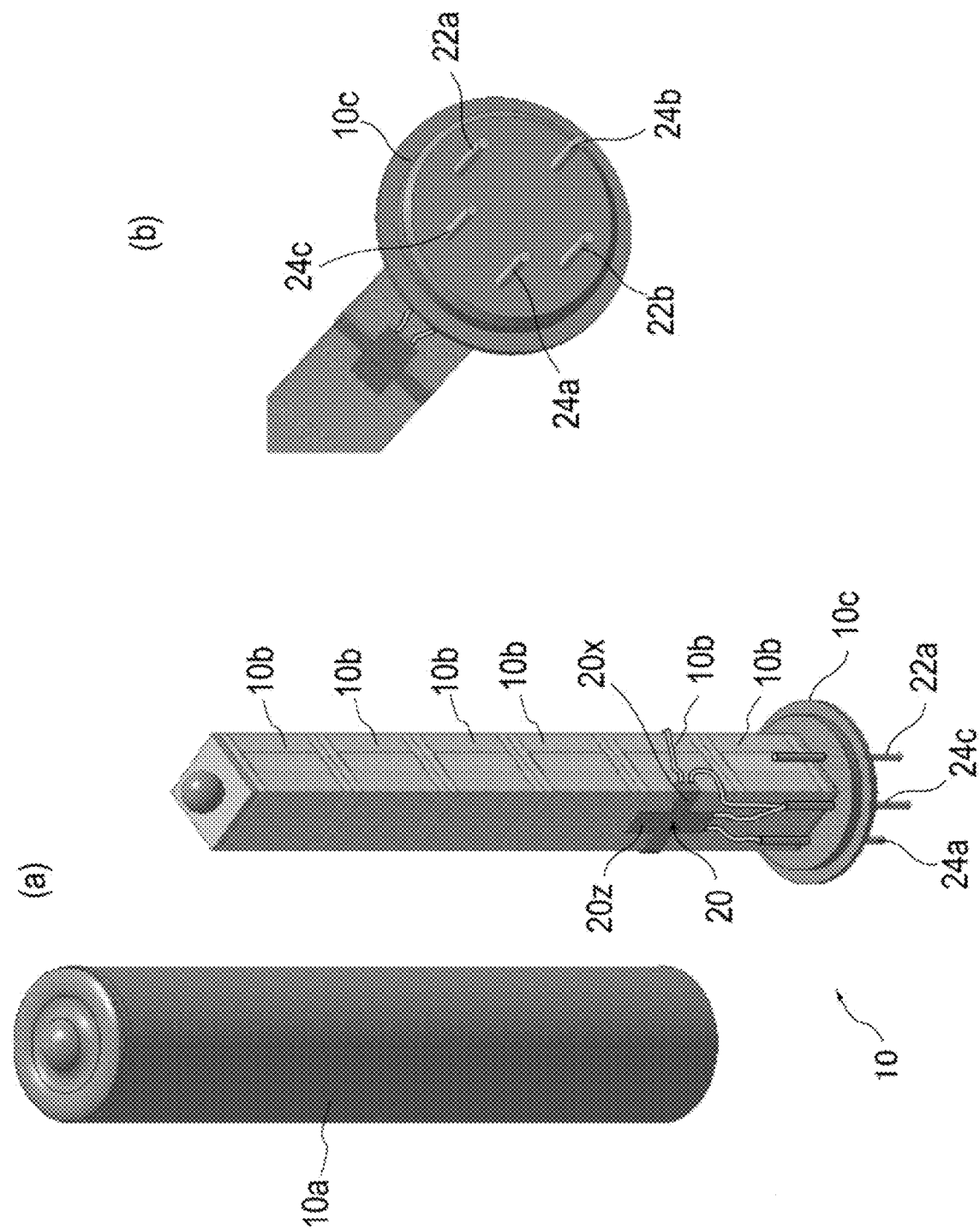
FIG. 4 is a diagram showing a piezoelectric actuator used in an embodiment of the present invention, (a) shows a cylinder and a piezo stack accommodated therein, and (b) shows a connector part.

Next, a detailed configuration of the piezo actuator 10 constituting the fluid control valve 8 will be described. FIG. 4 (a) shows an outer cylindrical body 10a, and a plurality of piezoelectric elements 10b accommodated in a state of being aligned in a row in the cylindrical body 10a (hereinafter, sometimes referred to as piezo stack 10b) by disassembling, FIG. 4 (b) shows a front view of a connector portion 10c shown in FIG. 4 (a). In FIG. 4 (a), the piezo actuator 10 is shown in the upside-down direction from FIG. 3.

As shown in FIG. 4A, in the piezoelectric actuator 10, a strain sensor 20 is directly attached to one of the plurality of piezoelectric elements 10b by an adhesive or the like. The strain sensor 20 is disposed on the side surface of the piezoelectric element, and in the present embodiment, is constituted by a first strain gauge 20z for detecting the strain in the z direction, i.e., the stacking direction of the piezoelectric element, that is also the main extension direction of the piezo stack, and a second strain gauge 20x for detecting the strain in the x direction that is perpendicular to the extension direction. As the first strain gauge 20z and the second strain gauge 20x, for example, a KFR-02N, a KFGS-1, a KFGS-3, or the like manufactured by Kyowa Denko Corporation can be used. In other embodiments, the piezoelectric actuator 10, may be constituted by a single piezoelectric element housed in the cylindrical body and a strain sensor attached to the side surface thereto.

In the present embodiment, the first strain gauge 20z is attached to the side surface of the piezoelectric element so as the whole is in contact with the piezoelectric element, the second strain gauge 20x is attached to the piezoelectric element so as to intersect across the central portion of the first strain gauge 20z. The first strain gauge 20z and the second strain gauge 20x, can detect the extension amount of the piezoelectric element as a change in the electrical resistance of the first strain gauge 20z and the second strain gauge 20x.

Further, as shown in FIG. 4 (b), in the connector portion 10c, a pair of drive voltage terminals 22a and 22b for applying a drive voltage to the piezo stack 10b, a first strain sensor output terminal 24a connected to one terminal of the first strain gauge 20z, a common output terminal 24c connected in common to the other terminal of the first strain gauge 20z and one terminal of the second strain gauge 20x, and a second strain sensor output terminal 24b connected to the other terminal of the second strain gauge 20x are provided.

A plurality of piezoelectric elements constituting the piezo stack 10b is electrically connected to the drive voltage terminals 22a and 22b by a known circuit configuration, by applying a voltage to the drive voltage terminals 22a and 22b, all of the piezoelectric elements can extend in the stack direction. As the piezoelectric actuator 10, a piezoelectric actuator manufactured by NTK can be used.

The first and second strain sensor output terminals 24a, 24b and the strain sensor common output terminal 24c are connected to a circuit provided on an external substrate to form a bridge circuit including the first strain gauge 20z and the second strain gauge 20x. In this bridge circuit, changes in the resistance value of the first strain gauge 20z and the second strain gauge 20x can be detected.

Figure 5:
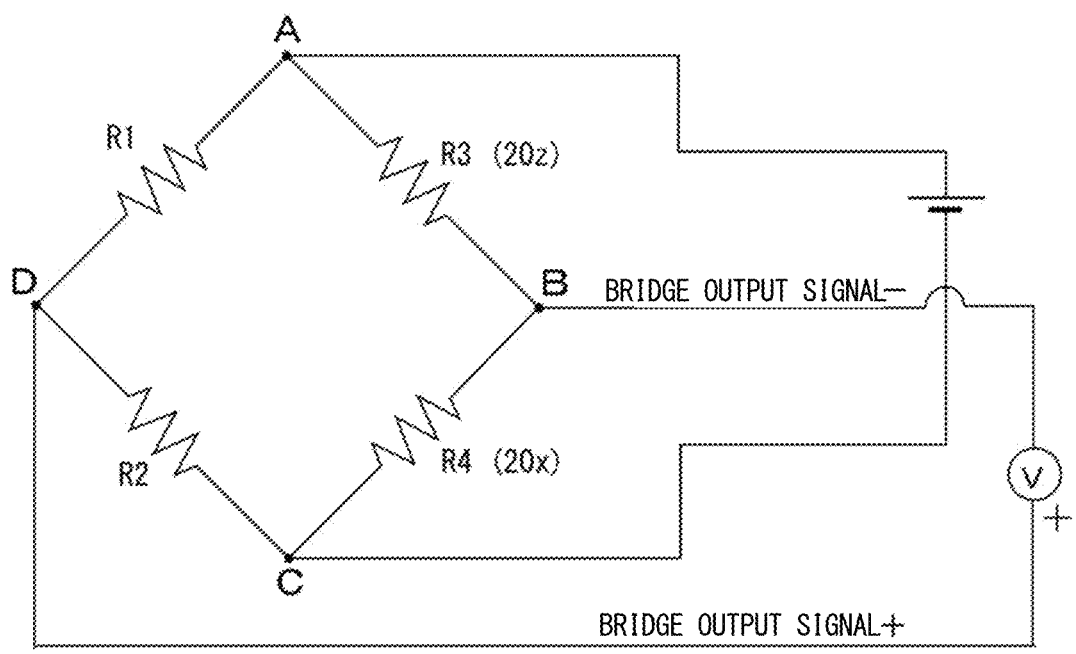
FIG. 5 is diagram showing an exemplary bridge circuit for obtaining output of a strain sensor used in an embodiment of the present invention.

FIG. 5 shows an exemplary equivalent circuit for detecting the changes in resistance value of the first strain gauge 20z and the second strain gauge 20x. In the equivalent circuit shown in FIG. 5, resistors R1 and R2 provided between the branch points A-D and the branch points C-D correspond to the fixed resistance of the known resistance value provided on an external substrate, a resistance R3 provided between the branch points A-B corresponds to the first strain gauge 20z, a resistance R4 provided between the branches point B-C corresponds to the secondary strain gauge 20x. In the present embodiment, the resistance values of the first strain gauge 20z and the second strain gauge 20x are set the same as the resistance values of the two fixed resistors R1 and R2, for example, both are set to 120 ohms or 350 ohms.

Further, in FIG. 5, the branch point A corresponds to the first strain sensor output terminal 24a, the branch point B corresponds to the strain sensor common output terminal 24c, the branch point C corresponds to the second strain sensor output terminal 24b. In this equivalent circuit, in a state where a predetermined bridge applied voltage is applied between the branch points A-C, a change in the resistance value of the first strain gauge 20z or the second strain gauge 20x is detected as a change in the bridge output signal (potential difference between the branch points B-D). When the magnitudes of the resistors R1 to R4 are the same as described above, the bridge output signal typically exhibits zero in an initial state where no stress occurs in the first and second strain gauges 20z and 20x.

When the driving voltage is applied to the piezo stack 10b, the piezoelectric element attached to the strain sensor 20 extends in the z direction, while shrinks in the x direction orthogonal thereto. In this case, the resistance value of the first strain gauge 20z increases corresponding to the extension amount of the piezoelectric element, the resistance value of the second strain gauge 20x decreases corresponding to the shrinkage amount of the piezoelectric element.

Then, in the circuit shown in FIG. 5, when the driving voltage is applied, the piezo stack 10b is extended, the bridge output signal increases with increasing of the distortion amount in the first strain gauge 20z, and the bridge output signal also increases with decreasing of the distortion amount in the second strain gauge 20x. Therefore, at the time of the piezo stack displacement, the variation of the bridge output signal corresponding to the sum of the increased distortion amount of the first strain gauge 20z, and the decrease in the distortion amount of the second strain gauge 20x occurs. Thus, the bridge output signal can be amplified.

Further, as described above, by configuring the bridge circuit using the first strain gauge 20z and the second strain gauge 20x orthogonal thereto, it is possible to correct the resistance value changes of the strain sensor 20 due to temperature differences. This is because, for example, when the piezoelectric element is expanded by the temperature rises, the expansion acts as an element for increasing the bridge output signal for the first strain gauge 20z, but serves as an element for decreasing the bridge output signal for the secondary strain gauge 20x, and bridge output signal with canceled the increasing element and decreasing element due to temperature can be obtained. Therefore, even when the piezoelectric element itself expands and contracts due to temperature changes, the influence on the bridge output signal can be reduced, and temperature compensation can be realized.

Hereinafter, with reference to FIG. 2 again, a flow rate control operation in the flow rate control device 100 will be described.

The flow rate control device 100 includes a first control circuit 7 for controlling the opening and closing operation of the pressure control valve 6 based on the output of the first pressure sensor 3. The first control circuit 7 is configured to feedback control the pressure control valve 6 so that the difference between a set upstream pressure received from outside and an output $P_1$ of the first pressure sensor 3 becomes zero. Thus, it is possible to maintain the pressure $P_1$ of the downstream side of the pressure control valve 6 and the upstream side the flow rate control valve 8 to the set value.

Further, the flow rate control device 100 receives the output from the strain sensor 20 provided in the flow rate control valve 8 as a piezo valve displacement, and thus a second control circuit 17 for controlling the drive of the piezoelectric element constituting the control valve 8, on the basis of the output. In FIG. 2, although an aspect of separately provided first control circuit 7 and second control circuit 17 is shown, they may be provided integrally.

The first control circuit 7 and the second control circuit 17 may be incorporated in the flow rate control device 100, or provided outside the flow rate control device 100. The first control circuit 7 and the second control circuit 17 typically include a CPU, a memory M such as a ROM or a RAM, an A/D converter, and the like, and may also include computer programs configured to execute the flow rate control operation and the self-diagnosis method which will be described later. The first control circuit 7 and the second control circuit 17 can be realized by a combination of hardware and software.

The flow rate control device 100 is configured to be able to control the flow rate of the a flowing downstream of the flow rate control valve 8, by controlling the drive of the piezoelectric element of the flow control valve 8, while controlling the pressure control valve 6 by the first control circuit 7 and the second control circuit 17, so that the upstream pressure $P_1$ of the first pressure sensor 3 output coincides with the set value. The flow rate control device 100 can perform flow rate control utilizing the principle that, when the critical expansion condition $P_1/P_2 \geq$ about 2 is satisfied ($P_1$: gas pressure upstream of the restriction part (upstream pressure), $P_2$: gas pressure downstream of the restriction part (downstream pressure)), the flow rate of the gas passing through the restriction part 2 and the flow rate control valve 8 is determined by the upstream pressure $P_1$ regardless the downstream pressure $P_2$.

When the critical expansion condition is satisfied, the flow rate Q on the downstream side of the flow control valve 8 is $Q = K_1 \cdot Av \cdot P_1$, where $K_1$ is a constant that depends on the fluid type and the fluid temperature. The flow rate Q is considered to be approximately proportional to the upstream pressure $P_1$ and the valve opening Av of the flow control valve 8. Further, when a second pressure sensor 4 is provided, even when the difference between the upstream pressure $P_1$ and the downstream-side pressure $P_2$ is small and the above-mentioned critical expansion condition is not satisfied, the flow rate can still be calculated, and based on the upstream pressure $P_1$ and the downstream pressure $P_2$ measured by each pressure sensor, flow rate Q can be calculated from a predetermined calculation expression $Q = K_2 \cdot Av \cdot P_2^m (P_1 - P_2)^n$, where $K_2$ is a constant that dependents on the fluid type and the fluid temperature, m and n are the actual an index derived based on the flow rate.

While controlling the upstream pressure $P_1$ to a constant value corresponding to a desired flow rate range using a pressure control valve 6, the flow rate control device 100 is able to suitably control the flow rate over a wide range by controlling the valve opening degree of the flow control valve 8 based on the output of the strain sensor 20 (piezo displacement amount). In particular, in the case of feedback controlling the flow control valve 8 based on the output of the strain sensor 20, as compared with the conventional case of feedback controlling the control valve based on the upstream pressure $P_1$, the responsiveness of the flow rate control can be improved. As can be seen from the above description, in the present embodiment, considering the distance between the valve seat and the valve element of the valve as the opening degree, the flow control valve 8 has a function of changing the opening degree so it can be used as a variable orifice (restriction part with variable opening degree) do you see my name could use it on there.

Further, in the flow rate control device 100 of the present embodiment, the maximum set flow rate of the restriction part 2 with a fixed opening, is set greater than the maximum set flow rate of the flow control valve 8 with a variable opening. Here, the maximum set flow rate of the restriction part 2 with a fixed opening degree means the flow rate of the gas flowing through the restriction part 2 when considering the pressure upstream of the restriction part 2 under a critical expansion condition in the flow rate control device 100 as the maximum set pressure, the maximum set flow rate of the flow control valve 8 with a variable opening degree means the flow rate of the gas flowing under the same conditions when the flow control valve 8 opens at the maximum set opening degree In this case, typically, the opening area of the restriction part 2 (i.e., the flow path cross-sectional area) is larger than the flow path cross-sectional area when the flow control valve 8 is at the maximum set opening degree. The restriction part 2 with a fixed opening, for example, is constituted by an orifice plate, with an maximum set flow rate 2000 sccm (orifice diameter: about 300 μm), the control flow rate of the flow rate control valve 8 is set to 2000 sccm or less.

Configuring as described above, by controlling the upstream pressure $P_1$ through the pressure control valve 6 using the restriction part 2 with a fixed opening degree as the main element of the flow rate control, it is possible to perform the flow rate control as same as the conventional pressure-type flow rate control device. It is also possible to control the gas flow rate by adjusting the opening degree of the flow control valve 8 while maintaining the upstream pressure $P_1$ constant using the pressure control valve 6. Therefore, it is possible to control the flow rate of gases in various aspects, it is also possible to correspond to the pulse flow rate control.

The flow rate control using the restriction part 2 with a fixed opening degree as the main element of the flow rate control is suitable for control of continuous flow which the flow rate control is maintained at a set value for a relatively long period of time. On the other hand, the flow rate control such that the flow rate is determined by the opening adjustment of the flow control valve 8 at a flow rate less than the maximum set flow rate of the restriction part 2 with a fixed opening, that is, the flow rate control such as using the flow control valve 8 as a variable orifice (restriction part variable openings) is suitable for controlling intermittent flow.

Here, the control of continuous flow broadly refers to the control of to fluid when the flow of the fluid continues, it also includes, for example, the case where the flowing status of the fluid changes from 100% flow rate to 50% flow rate. Further, when performing control on continuous flow using the restriction part 2 with a fixed opening, the flow rate control valve 8 is fully opened (the maximum opening degree) or, at least it is preferable to maintain a larger opening degree than the opening degree of the restriction part 2 with a fixed opening degree.

Further, the intermittent flow control is not limited to periodic opening and closing control at regular intervals such as pulse flow control, it also includes pulse periodic opening and closing control performed irregularly, opening and closing control such as the pulse amplitude is not constant but fluctuates, and opening and closing control such as the pulse width fluctuates.

Hereinafter, a self-diagnosis method performed using the flow rate control device 100 will be described.

Figure 6:
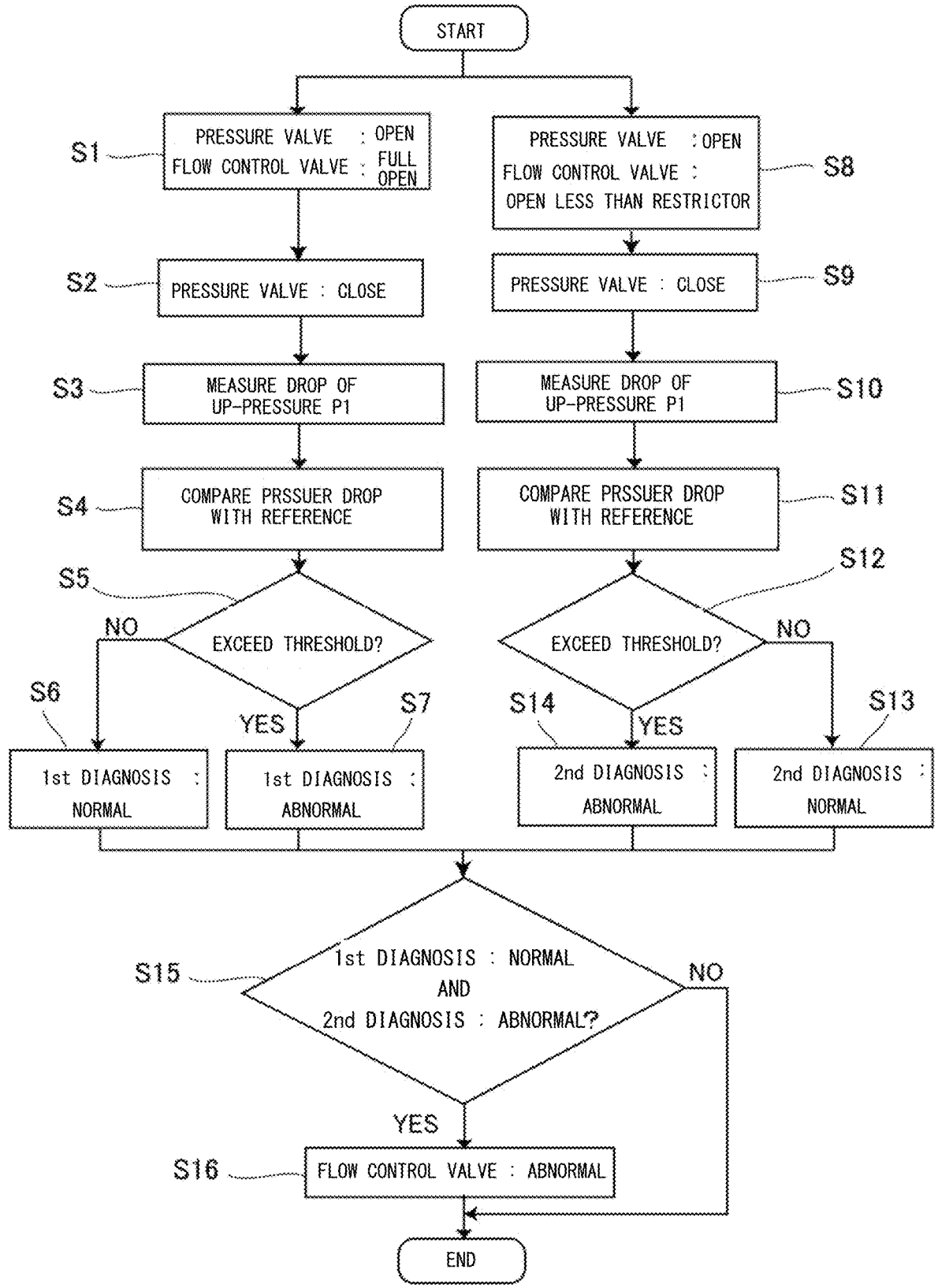
FIG. 6 is a flowchart illustrating the self-diagnostic method of the flow rate control device according to an embodiment of the present invention.

FIG. 6 shows a flowchart of the self-diagnosis method of the present embodiment. As shown in Step S1, the pressure control valve 6 is controlled to be in the open state (the maximum set opening degree) so that the upstream pressure $P_1$ becomes a pressure corresponding to the 100% flow rate. In addition, in the case where the pressure control valve 6 is fully opened, and is set at the maximum opening degree on the setting when the upstream pressure $P_1$ becomes a pressure corresponding to the 100% flow rate (the maximum set opening degree), the pressure control valve 6 is conceivable to be set at the maximum opening degree, but in the present embodiment, the pressure control valve 6 is set at the maximum set opening degree. At this time, the downstream pressure $P_2$ is set smaller than the upstream pressure $P_1$, and is set to a vacuum pressure of 100 torr or less, for example, using a vacuum pump connected to the process chamber. However, the flow of self-diagnosis is not limited thereto, it may be started from a state where the gas is flowing at any flow rate setting when one process of the semiconductor manufacturing process is completed (e.g., a state where the gas is flowing at the 60% flow rate), or at a time when the pressure control valve 6 is in the intermediate open state, i.e., the opening state is less than the maximum set opening degree.

Further, in step S1, the flow rate control valve 8 on the downstream side is typically open to the maximum opening degree, or full opening, the gas flows from the upstream side of the pressure control valve 6 to the downstream side through the restriction part 2 and the flow rate control valve 8. At this time, the flow control valve Bis able to flow gas at a low rate that is greater than the maximum set flow rate of the restriction part 2 (e.g., 2000 sccm), i.e., the opening degree of the flow control valve 8 in step S1 is set to an opening degree that is more than the opening degree of the restriction part 2. Therefore, the gas flows at a maximum set flow rate that depends on the opening area of the restriction part 2, and the upstream pressure $P_1$, but the flow is not limited by the flow rate control valve 8. In addition, the opening degree of the flow rate control valve 8 may be set to an opening that is larger than the opening of the restriction part 2, i.e., an open state capable of flowing gas at a flow rate greater than the maximum set flow rate of the restriction part 2, it may not necessarily be fully opened.

Here, the maximum opening degree of the flow rate control valve 8 is different from the maximum set opening corresponding to the maximum set flow rate of the flow rate control valve 8 as described above, it is a sufficiently larger opening than the maximum set opening. When using the flow rate control valve 8 as a restriction part with variable opening degrees in the main element of the flow rate control, the opening adjustment is performed between the opening zero (closing) to the maximum set opening degree, on the other hand, when not used for flow control, it is possible to open to a larger opening. For example, when using the above normally open type valve as the flow rate control valve 8, the maximum opening degree is the opening degree when no driving voltage applied, the maximum set opening degree is the opening degree when the minimum driving voltage, that is set in accordance with the flow rate range to be controlled, is applied.

Figure 7:
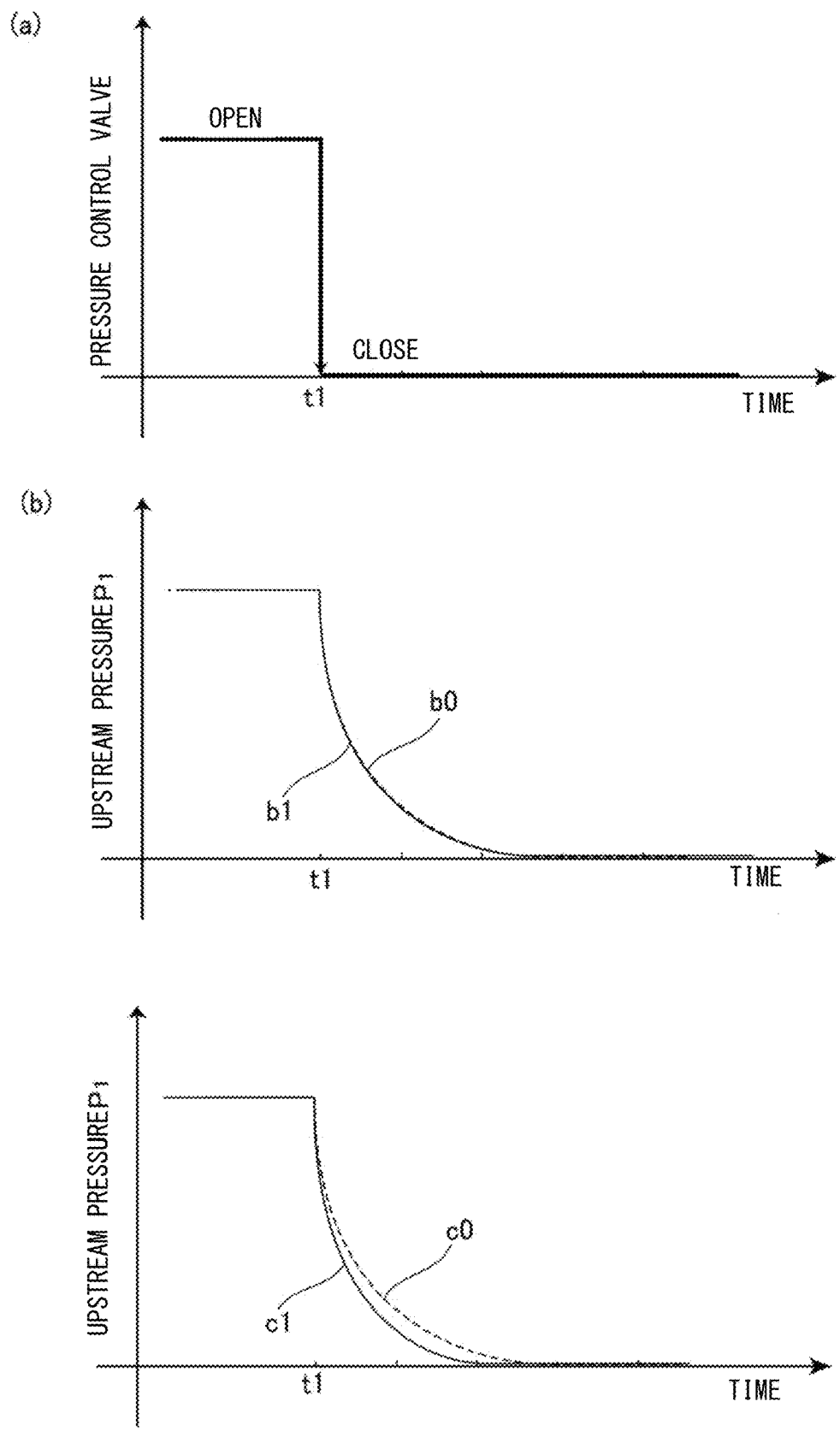
FIG. 7 is a diagram for explaining the self-diagnosis method of the flow rate control device according to an embodiment of the present invention, (a) shows the opening and closing operation of the pressure control valve, (b) shows the case where the measured pressure drop characteristic coincides with the reference pressure drop characteristic coincides, (c) shows the case where the measured pressure drop characteristicdiffers from the reference pressure drop characteristic.

Next, in step S2, the pressure control valve 6 is in the open state, from a state where the gas is flowing stably by opening the flow rate control valve 8 to an opening degree that is larger than the opening of the restriction part 2, the pressure control valve 6 is changed from the open state to the closed state. This operation may be performed by for example, inputting a setting signal for setting the flow rate to zero to the pressure control valve 6. On the other hand, the downstream pressure $P_2$ is maintained at a low pressure. Therefore, after closing the pressure control valve 6, the residual gas between the pressure control valve 6 and the restriction part 2 flows out to the downstream side through the restriction part 2. In FIG. 7 (*a*), a state of changing the pressure control valve 6 from the open state to the closed state at time t1 is shown.

Then, as shown in step S3 in FIG. 6, the drop characteristics of the upstream pressure $P_1$ after the pressure control valve 6 in step S2 is changed to the closed state is measured by using the first pressure sensor 3. Thus, the pressure drop characteristics corresponding to the state of the restriction part 2, i.e., data indicating the characteristics of the drop of pressure with respect to time is obtained. Pressure drop characteristics or measurement data measured in step S3, for example, may be recorded in a measurement storage unit provided in the storage device of the first control circuit 7, or a measurement storage unit provided in the external device connected to the flow rate control device 100.

The pressure drop characteristic may be, for example, a plurality of upstream pressure data measured at a predetermined sampling rate. Further, the pressure drop characteristic may be not only the pressure value at each time when the pressure drops, but also the slope (differential value) at each time when the pressure drops. As will be described later, the pressure drop characteristic may also be various coefficients included in the characteristic equation determined by the temporal change of the measured pressure.

Nest, as shown in step S4, the pressure drop characteristic obtained in step S3 is compared with a reference pressure drop characteristic. Here, the reference pressure drop characteristic is generally initial pressure drop characteristic measured in advance before factory shipment, for example, those stored in advance in the storage unit of the first control circuit 7. However, the reference pressure drop characteristic may be the pressure drop characteristic of the previous measurement or the like. In addition, in FIG. 7 (*b*), the reference pressure drop characteristic b0, and the pressure drop characteristic b1 measured after the valve closing time t1 is consistent, shows a case where there is no difference between them.

In step S4 shown in FIG. 6 as described above, a comparison between the pressure drop characteristic and the reference pressure drop characteristic will be performed, as shown in step S5, the absolute value of these differences (comparison result) is small, for example, when it is less than a predetermined threshold value, it can be determined that an abnormality such as enlargement or clogging has occurred in the restriction part 2 or the like (step S7). As a result of determining whether there is an abnormality in this manner (hereinafter, sometimes referred to as the first diagnostic result), it can be used to detect abnormality in the pressure control valve 6, abnormality in the restriction part 2, further overall abnormality on the downstream side of the restriction part 2. The first diagnostic result indicating whether there is an abnormality, for example, may be recorded in the determination storage unit provided in the storage device of the first control circuit 7, or the determination storage unit provided in the external device connected to the flow rate control device 100.

The comparison between the pressure drop characteristic and the reference pressure drop characteristic in step S4 can be performed in various aspects. For example, the sum of the differences between the measured pressure and the reference pressure at each sample point may be used as a comparison result to determine whether there is an abnormality in the restriction part 2 based on the magnitude of the comparison result.

Further, considering the initial upstream pressure when measuring the pressure drop characteristic is $P_1$, the function (sometimes referred to as the pressure drop data) of the upstream pressure with respect to time at the time of pressure drop is P (t), it can be expressed as $\ln(P(t)/P_i) = SC(RT)^{1/2}/V \cdot t$, where S is the opening cross-sectional area of the restriction part, C is the constant of the gas, R is the gas constant, T is the gas temperature, V is the flow path volume between the pressure control valve 6 and the restriction part 2, t is time. Assuming that C, R, T, and V are constants that do not depend on time, since $\ln(P(t)/P_i) = -\alpha t$ ($\alpha$ is a constant) is satisfied, it has been found that $\ln(P(t)/P_i)$ can be defined as a linear function with respect to time t.

Therefore, from the measured P (t), the slope $\alpha$ of $\ln(P(t)/P_i)$ can be obtained by a least squares method or the like, also by comparing with the reference slope $\alpha_0$ stored in advance in the memory as the reference pressure drop data, the difference of the slope can also be used as a comparison result. A flow rate control device for performing self-diagnosis using pressure drop characteristic is disclosed in International Publication No. WO 2017/170174 (Patent Document 3) by the applicant of the present application. Various self-diagnostic modes described in WO 2017/170174 may be utilized in embodiments of the present invention.

While obtaining the first diagnosis result as described above, in the self-diagnosis method of the present embodiment, a step of setting the flow rate control valve 8 to an opening degree less than the restriction part, measuring the pressure drop characteristic, and comparing the measured pressure drop characteristic with the reference pressure drop characteristic to determine whether there is an abnormality is also performed.

In this step, as shown in step S8 in FIG. 6, while controlling the pressure control valve 6 so that the upstream pressure $P_1$ becomes a pressure corresponding to 100% flow rate, and keeping the flow control valve 8 in an opening state with a predetermined opening degree that is less than the restriction part, from a state where the gas flows stably to the downstream side, as shown in step S9, changing the pressure control valve 6 from the open state to the closed state. Then, as shown in step S10, measuring the drop characteristic of the upstream pressure $P_1$ after the pressure control valve 6 is in the closed state using the first pressure sensor 3. Thus, the pressure drop characteristic corresponding to the state of the flow rate control valve 8 can be obtained.

The above-described steps S8 to S10 of measuring the pressure drop characteristic may be the same as the steps S1 to S3 of measuring the pressure drop characteristic, except that the flow control valve 8 is set to a opening degree that is less than the restriction part. Also in steps S8 to S10, it is also possible to start the measurement of the pressure drop characteristic by keeping the pressure control valve 6 in the intermediate open state. The pressure drop characteristic is not limited to the pressure value measured every time as long as it indicates the characteristic of the pressure drop, and may be obtained in various manners. In addition, the pressure drop characteristic measuring process in steps S8 to S10 may be performed after or before the pressure drop characteristic measuring process in steps S1 to S3.

Next, as shown in step S11, is comparing the pressure drop characteristic obtained in step S10 and the reference pressure drop characteristic. The reference pressure drop characteristic used here is obtained under the same conditions as the measurement in step S10 described above, that is, by flowing gas with the flow rate control valve 8 in the open state of a predetermined opening degree that is less than the restriction part, it is typically different from the reference pressure drop characteristic used in step S4. The reference pressure drop characteristic used in this step S11 is also an initial pressure drop characteristic measured in advance before shipment from the factory, for example, pre-stored in a stored storage device provided in the first control circuit 7. In addition, in FIG. 7 (c), with respect to the reference pressure drop characteristic c0, the pressure drop characteristic c1 measured after the valve closing time t1 is shifted downward, the case where these differences are generated on the negative side is shown.

In step S11 shown in FIG. 6 as described above, a comparison between the pressure drop characteristic and the reference pressure drop characteristic is performed, as shown in step S12, when the absolute value of these differences (comparison result) is small, for example, less than a predetermined threshold value, it can be determined that there is a high possibility that the state of the flow rate control valve 8 is in normal state which has not changed from the initial state n, (step S13). Further, if the absolute value of these differences exceeds the threshold value, it can be determined that there is a high possibility that an abnormality has occurred in the flow rate control valve 8 (step S14). The second diagnostic result obtained in this way, for example, may be recorded in the determination storage unit provided in the storage device of the first control circuit 7, or may be recorded in the determination storage unit provided in the external device connected to the flow rate control device 100.

However, when an abnormality of the restriction part 2 or an abnormality of the pressure control valve 6 occurs in the abnormality diagnosis result (second diagnosis result) obtained in steps S11 to S14, there is a possibility that the abnormality affects the abnormality diagnosis result (second diagnosis result). Therefore, in the present embodiment, as shown in step S15, whether there is the abnormality of the flow rate control valve 8 is diagnosed based on the first diagnosis result and the second diagnosis result. More specifically, when it is determined that there is no abnormality in the first diagnostic result, and it is determined that there is an abnormality in the second diagnostic result (i.e., when it is determined that there is an abnormality only in the second diagnostic result), it is determined that there is an abnormality in the flow rate control valve 8 as shown in step S16, in particular, in the distance between the valve seat and the valve element of the flow rate control valve 8.

Further, in the present embodiment, when it is determined that there is an abnormality in the distance between the valve seat and the valve element of the flow rate control valve 8, in particular, it is determined that there is an abnormality in the output of the strain sensor provided in the flow rate control valve 8. More specifically, in step S15, when it is determined that there is an abnormality only in the second diagnosis result, the output span of the strain sensor fluctuates, and the output characteristic of the strain sensor fluctuates from the initial state, and it is determined that the output of the strain sensor does not accurately indicate the valve opening degree.

Figure 8:
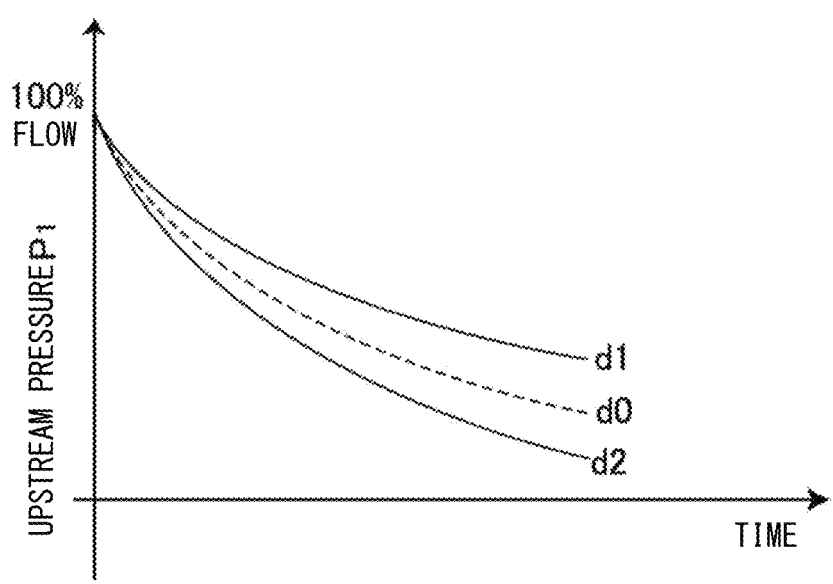
FIG. 8 is a graph showing a case where the measured pressure drop characteristic is shifted to the upper side and the case where it shifted to the lower side, with respect to the reference pressure drop characteristic.

Then, when a change in the output characteristic of the strain sensor is detected in step S16, the span of the strain sensor output based on the comparison result obtained in step S11 is corrected. For example, in the case where the flow rate control valve 8 is a normally open type valve, as shown in FIG. 8, when a comparison result that the measured pressure drop characteristic d1 is shifted from the reference pressure drop characteristic d0 to the upper side (i.e., comparison result that the pressure drop characteristic d1 is larger than the reference pressure drop characteristic d0) is obtained, since the span of the strain sensor decreases, the displacement amount in the piezo displacement control is larger than before, so it can be considered that the valve has fluctuated more than the output of the strain sensor and is in the closed state. On the other hand, when a comparison result that the measured pressure drop characteristic d2 is shifted from the reference pressure drop characteristic d0 to the lower side (i.e., comparison result that the pressure drop characteristic d1 is smaller than the reference pressure drop characteristic d0) is obtained, the span of the strain sensor increases, the displacement amount in the piezo displacement control has decreased more than before, so it can be considered that the valve has fluctuated to more than the output of the strain sensor and is in the open state. In addition, when the flow rate control valve 8 is a normally closed type, the shifting direction of the comparison result, and the shifting direction of the opening and closing of the valve are reversed to the above.

Therefore, based on the above comparison results, for example, by determining the amplification factor of the output of the strain sensor 20, if obtaining the valve opening of the flow control valve 8 based on the output of the amplified strain sensor 20, it is possible to correct the relationship between the valve opening and the output of the strain sensor 20, and perform the flow rate control constantly and with good accuracy.

Although the self-diagnosis method according to the embodiment of the present invention has been described above, any one of the pressure drop characteristic measurement steps S1 to S3 and the pressure drop characteristic measurement steps S8 to S10 may be performed first. The comparative diagnosis process of steps S4 to S7 may be performed after the measurement process of the pressure drop characteristic of steps S1 to S3, or may be performed after the measurement process of the pressure drop characteristic of steps S8 to S10. Also, the comparison and diagnosis process of steps S4 to S7 may be performed prior to or after the comparison and diagnosis process of steps S11 to S14. Of course, the comparison diagnosis process of steps S4 to S7 and the comparison diagnosis process of steps S11 to S14 may be performed simultaneously in parallel. In addition, the comparison process of step S4 only may be performed before the comparison diagnosis process of steps S11 to S14, and the diagnosis process of steps S5 to S7 may be performed after the comparison diagnosis process of steps S11 to S14. It need not to say that these processes may be performed in any order or concurrently as possible.

In addition, keeping the pressure control valve 6 closed in the pressure drop characteristic measurement process of steps S1 to S3 and the pressure drop characteristic measurement process of steps S5 to S7, and keeping the flow rate control valve 8 open (fully open in steps S1 to S3, keep opening degree less than the restriction part 2 in steps S5 to S7) may be either performed first, or may be performed at the same time. Further, in the case where a downstream valve is provided downstream side of the flow rate control valve 8, while performing the measurement of the pressure drop characteristic by closing the downstream valve, it is also possible to perform abnormality detection by comparison with the corresponding reference pressure characteristic.

Further, in the above embodiments, some or all the storage of the measurement results of the pressure drop characteristic, the comparison between the pressure drop characteristic and the reference pressure drop characteristic, or, the determination of whether there is an abnormality, may be performed outside of the flow control device 100 (external computer or the like).

Further, in the present embodiment described above, the drop of the upstream pressure P1 caused by closing the pressure control valve 6 is measured, but it is not limited thereto, the pressure drop may be caused by closing the on-off valve (not shown) provided upstream side the pressure control valve 6. In this specification, any flow path blocking mechanism provided upstream side of the restriction part 2 may be referred to as an upstream valve (including the pressure control valve 6).

Further, in the flow rate control device according to the embodiments of the present invention, the flow rate control valve may be a normally closed type piezoelectric element driven valve, in this case also, by controlling the drive of the piezoelectric element of the flow rate control valve in response to the strain sensor output, it is possible to perform the flow rate control with good responsiveness.

INDUSTRIAL APPLICABILITY

The flow rate control device according to the embodiments of the present invention can be suitably used even when high-speed responsiveness of flow rate control is required in a semiconductor manufacturing process.

DESCRIPTION OF NUMERICALS

1 Flow path
2 Restriction part
3 1st pressure sensor
4 2nd pressure sensor
5 Inflow pressure sensor
6 Pressure control valve
7 First control circuit
8 Flow rate control valve
10 Piezo actuator
10b Piezo stack (piezoelectric element)
11 Valve element
12 Valve seat
13 Metal diaphragm valve element
14 Guide tube
15 Elastic member
16 Support
17 Second control circuit
18 Valving element presser
20 Strain sensor
20z First strain gauge
20x Second strain gauge
100 Flow rate control device

The invention claimed is:

1. A self-diagnosis method of a flow rate control device including a pressure control valve provided in a flow path; a flow rate control valve provided downstream side of the pressure control valve; a restriction part provided downstream side of the pressure control valve; and a pressure sensor provided downstream side of the pressure control valve and upstream side of the restriction part, wherein the flow rate control valve includes a valve element seated on/off a valve seat, and a piezoelectric element for moving the valve element to seat on/off the valve seat, the self-diagnosis method of the flow rate control device comprising:
a step (a) for measuring a pressure drop characteristic of a fluid pressure by using the pressure sensor, after the pressure control valve has been changed to a closed state from a state where the pressure control valve is in an open state, and the opening degree of the flow rate control valve is larger than the opening degree of the restriction part, while the fluid is flowing from the upstream side of the pressure control valve to the downstream side through the flow rate control valve and the restriction part;

a step (b) for measuring the pressure drop characteristic of the fluid pressure by using the pressure sensor, after the pressure control valve changed to the closed state from a state where the pressure control valve is in an open state, and the opening degree of the flow rate control valve is smaller than the opening degree of the restriction part, while the fluid flows from the upstream side of the pressure control valve to the downstream side through the flow control valve and the restriction part;

a step (c) for determining whether there is an abnormality by comparing the pressure drop characteristic measured in the step (a) with a corresponding reference pressure drop characteristic stored in advance;

a step (d) for determining whether there is an abnormality by comparing the pressure drop characteristic measured in the step (b) with a corresponding reference pressure drop characteristic stored in advance; and a step (e) for determining that there is an abnormality in the distance between the valve seat and the valve element of the flow control valve, when an abnormality is found only in the step (d), among the determinations made in the step (c) and the step (d).

2. The self-diagnosis method of the flow rate control device according to claim 1, wherein either the step (a) is performed prior to the step (b), or the step (b) is performed prior to the step (a).

3. The self-diagnosis method of the flow rate control device according to claim 1, wherein the step (c) is performed after the step (a) but before the step (b), and the step (d) is performed after the step (b) and the step (c).

4. The self-diagnosis method of the flow rate control device according to claim 1, wherein the flow rate control device further comprises a measurement storage unit for storing data measured in the step (a) and the step (b).

5. The self-diagnosis method of the flow rate control device according to claim 1, wherein the flow rate control device further comprises a determination storage unit for storing the results of the determinations in the step (c) and the step (d).

6. The self-diagnostic method of the flow rate control device according to claim 1, wherein a strain sensor is fixed to the piezoelectric element, and a distance between the valve seat and the valve element is obtained on the basis of an output of the strain sensor.

7. The self-diagnosis method of the flow rate control device according to claim 6, wherein it is determined that there is an abnormality in the output of the strain sensor, when it is determined in step (e) that there is an abnormality in the distance between the valve seat and the valve element of the flow rate control valve.

8. The self-diagnosis method of the flow rate control device according to claim 6, wherein it is determined that the output span of the strain sensor decreases, when the pressure drop characteristic measured in step (b) is larger than the corresponding reference pressure drop characteristic stored in advance.

9. The self-diagnosis method of the flow rate control device according to claim 6, wherein it is determined that the output span of the strain sensor increases, when the pressure drop characteristic measured in the step (b) is smaller than the corresponding reference pressure drop characteristic stored in advance.

10. The self-diagnosis method of the flow rate control device according to claim 1, wherein the pressure control valve is in an maximum set opening state, when the pressure control valve is open and the fluid is flowing downstream in step (a) and the step (b).

11. The self-diagnosis method of the flow rate control device according to claim 1, wherein the pressure control valve is in an intermediate open state, when the pressure control valve is open and the fluid is flowing downstream in step (a) and the step (b).

* * * * *